US009027064B1

(12) United States Patent
Opare-Abetia et al.

(10) Patent No.: US 9,027,064 B1
(45) Date of Patent: May 5, 2015

(54) UNIFIED PUBLISHING PLATFORM THAT SEAMLESSLY DELIVERS CONTENT BY STREAMING FOR ON-DEMAND PLAYBACK AND BY STORE-AND-FORWARD DELIVERY FOR DELAYED PLAYBACK

(71) Applicants: Susie Opare-Abetia, San Francisco, CA (US); Zarik Boghossian, Glendale, CA (US)

(72) Inventors: Susie Opare-Abetia, San Francisco, CA (US); Zarik Boghossian, Glendale, CA (US)

( * ) Notice: Subject to any disclaimer, the term of this patent is extended or adjusted under 35 U.S.C. 154(b) by 0 days.

(21) Appl. No.: 13/910,941

(22) Filed: Jun. 5, 2013

Related U.S. Application Data

(60) Provisional application No. 61/656,466, filed on Jun. 6, 2012.

(51) Int. Cl.
H04N 7/173 (2011.01)
H04N 21/238 (2011.01)

(52) U.S. Cl.
CPC .................................. *H04N 21/238* (2013.01)

(58) Field of Classification Search
None
See application file for complete search history.

(56) References Cited

U.S. PATENT DOCUMENTS

| 5,987,509 | A | * | 11/1999 | Portuesi | 725/113 |
| 2008/0209487 | A1 | * | 8/2008 | Osann et al. | 725/109 |
| 2009/0228919 | A1 | * | 9/2009 | Zott et al. | 725/34 |
| 2011/0296474 | A1 | * | 12/2011 | Babic | 725/87 |

* cited by examiner

Primary Examiner — Oschta Montoya
(74) Attorney, Agent, or Firm — Plager Schack LLP

(57) ABSTRACT

Some embodiments seamlessly deliver video content by streaming the video content for on-demand playback and by store and forward delivery of the video content for delayed playback. In some embodiments, a user combines a plurality of video content items from a plurality of content sources, organizes the video content items into a set of playlists, and assigns the playlists to a set of channels for distributing the video content items in the playlists. In some embodiments, each channel is associated with at least two video distribution protocols that deliver the video content items of the assigned playlist at approximately the same time.

14 Claims, 4 Drawing Sheets

UNIFIED PUBLISHING PLATFORM THAT SEAMLESSLY DELIVERS CONTENT BY STREAMING FOR ON-DEMAND PLAYBACK AND BY STORE-AND-FORWARD DELIVERY FOR DELAYED PLAYBACK

CLAIM OF BENEFIT TO PRIOR APPLICATION

This application claims benefit to U.S. Provisional Patent Application 61/656,466, entitled "Online System For Simultaneous Streaming, Store And Forward Media Delivery," filed Jun. 6, 2012. The U.S. Provisional Patent Application 61/656,466 is incorporated herein by reference.

BACKGROUND

Organizations and individuals want to manage and deliver video content to a variety of viewing devices. For example, video content is regularly viewed by consumers using computers with video playback software or a web browser, mobile computing devices such as smart phones and hand-held media players, tablet computing devices, and televisions. In many cases, these organizations and individuals need to manage and deliver video content for internal organizational needs, such as to support sales and marketing, and to provide corporate communications easily and cost-effectively. The manner of delivering video content in some cases depends on the accessibility of network resources. Two examples of video content delivery include streaming video content data from a content server to a content client, and store and forward delivery of video content from a content server to a content storing device that forwards the video content to the viewing device. However, delivery of video content by streaming is different from store and forward delivery of video content. The delivery differences are problematic for those who want the flexibility to decide whether to stream video content or download the video content for future playback.

The differences in delivery of video content relate to a variety of factors, including network accessibility and speed, user preference, video provider preference, etc. In terms of network accessibility, for example, video content can be streamed to a viewing device when there is a persistent Internet connection available, but may fail if the Internet connection was not persistent. As many viewing devices connect to a corporate network that provides access to the Internet, other factors may be involved. For instance, the video content cannot always be streamed to the viewing device, due to inconsistent or only periodic Internet access, such as when upgrades are occurring on the internal network. Moreover, a user of the viewing device may wish to simply delay playback of the video content instead of viewing the video content contemporaneously with a request for the video content. In this case, playback of the video content is delayed (i.e., occurs at some time after downloading the video content) by choice, not technical or hardware limitations. Typically, preparing the video content for delayed playback involves delivering the video content to a store-and-forward computing device, such as a media player, which stores the video content for local playback by the viewing device. Therefore, because the video content is stored locally by the media player, which is accessible to the viewing device, playback of the video is possible without a simultaneous connection to the Internet.

The available systems for delivering video content are typically designed to deliver video by only one of the two mechanisms, that is, by streaming or by store and forward delivery (e.g., for local playback later). None of the prior systems deliver video using these two different mechanisms simultaneously. Therefore, it has been necessary for users of these prior systems to acquire and use two separate, unrelated solutions to deliver streaming video and at the same time publish video for local playback. This made the process of video delivery using these two mechanisms costly, cumbersome and error-prone, requiring one-off custom solutions to support integrated work flows. In addition, the prior systems made it impossible to use a single reporting system to track key metrics such as where video content was being displayed and who was viewing the content. Moreover, the prior video delivery systems made it impossible to use third party solutions, such as ad-insertion networks and analytic tools, from a single point of integration.

Thus, what is needed is a way to deliver, at approximately the same time, video content by (i) streaming the video content and (ii) transmitting the video content by store and forward delivery of the video content. The video delivery solution should also provide a unified report generation system for tracking and reporting on video content distribution.

BRIEF SUMMARY

Some embodiments of the invention include a novel system and process for seamlessly delivering video content by streaming the video content for on-demand playback and by store and forward delivery of the video content for delayed playback. In some embodiments, the process allows a user to combine a plurality of video content items from a plurality of content sources, organize the video content items into a set of playlists, and assign the playlists to a set of channels for distributing the video content items in the playlists. In some embodiments, each of the playlists comprises a set of video content playback rules for playing the video content items in the playlist. In some embodiments, each channel is associated with at least two video distribution protocols that deliver the video content items of the assigned playlist at approximately the same time. In some embodiments, a first video distribution protocol delivers the video content items of the playlist by streaming portions of the video content data in sequence to a video playback client for contemporaneous playback of the video content. In some embodiments, a second video distribution protocol delivers the video content items by transmitting the entire video content data to a store-and-forward client for storage and subsequent playback by one or more of a set of video playback clients.

In some embodiments, the video delivery system includes a content server computing device connected to a computer network, a content playback computing device connected to the content server computing device through the computer network, a store-and-forward computing device connected to the content server computing device through the computer network, a database server that provides access to a set of multimedia content assets stored in a content database, and a reporting server that generates multimedia content asset reports. In some embodiments, a multi-layered software application server includes a plurality of applications for creating, organizing, and seamlessly delivering both streamed and downloaded multimedia content.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description, several examples and embodiments of the invention are described. However, it will be clear to a person skilled in the art that the invention is not limited to the embodiments set forth and can be adapted for any of several other uses.

Some embodiments of the invention include a novel system and process for seamlessly delivering video content by streaming the video content for on-demand playback and by store and forward delivery of the video content for delayed playback.

By providing both streaming and downloading transmission protocols, the system and process provides the ability to access, create, and play video content files from video playback clients in any situation. For instance, a video playback client can be connected to the Internet and, therefore, wish to view the video on-demand, while at another time, the video playback client can be away from a viable and persistent connection to the Internet and, thus, may wish to delay playback of a requested video. The system and process of some embodiments allows convenient access, creation, organization, and previewing of such video content by creating multiple versions of the video content suitable for distribution under particular situations.

Several more detailed embodiments are described in the sections below. Section I provides a conceptual description of a process and a system for multimedia content creation and delivery. Next, Section II provides a description for an architecture of a system that simultaneously delivers video content in different formats for different situations. Section III describes an electronic system that implements multimedia content creation and delivery system.

I. Content Creation and Delivery

In some embodiments, a process for seamlessly delivering video content by streaming and by store and forward delivery allows a user to combine a plurality of video content items from a plurality of content sources, organize the video content items into a set of playlists, and assign the playlists to a set of channels for distributing the video content items in the playlists. In some embodiments, each playlist comprises a set of video content playback rules for playing the video content items in the playlist. In some embodiments, each channel is associated with at least two video distribution protocols that deliver the video content items of the assigned playlist at approximately the same time. In some embodiments, a first video distribution protocol delivers the video content items of the playlist by streaming portions of the video content data in sequence to a video playback client for contemporaneous playback of the video content. In some embodiments, a second video distribution protocol delivers the video content items by transmitting the entire video content data to a store-and-forward client for storage and subsequent playback by one or more of a set of video playback clients.

Figure 1:
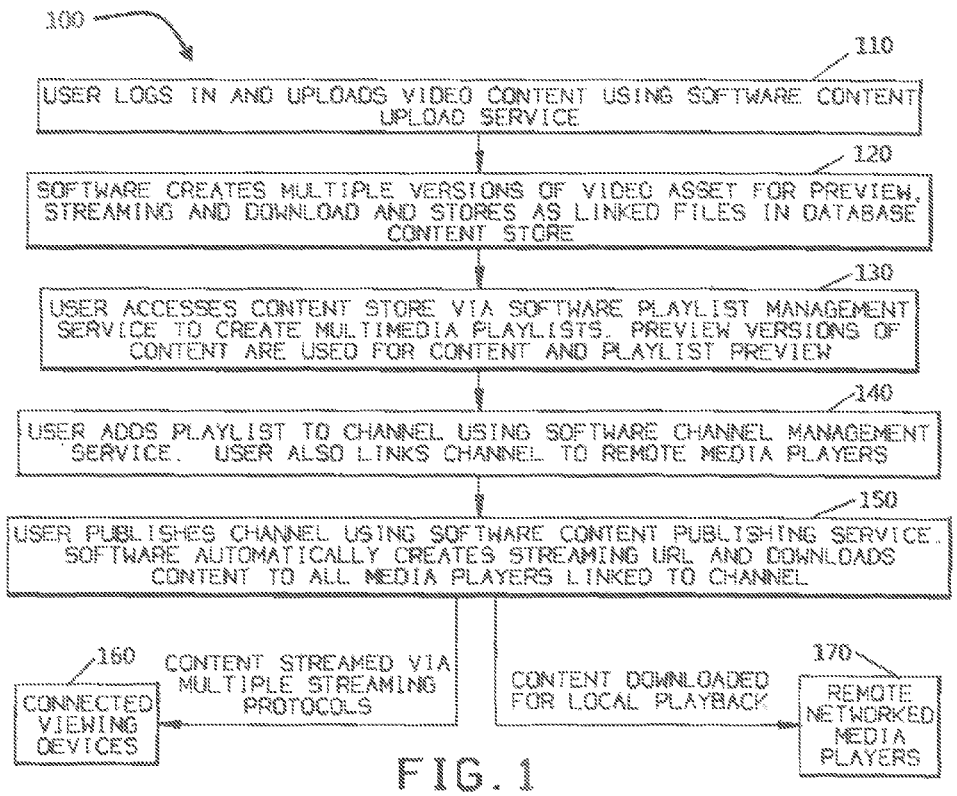
FIG. 1 conceptually illustrates an example process for uploading, organizing, and distributing video content in some embodiments.

FIG. 1 conceptually illustrates an example process for uploading, organizing, and distributing video content in some embodiments. In some embodiments, the process 100 is performed by a software application connected to a network, such as the Internet. With this software, from a single Internet enabled point of access, users with basic computer skills can easily combine content originating from multiple sources, organize this content into playlists with specific playback rules, and assign these playlists to channels that can be simultaneously delivered for both streaming and local playback applications. A unified reporting system tracks metrics across both delivery mechanisms, with common integration points for third party solutions.

Previously, organizations and individuals had to use several different publishing platforms, each linked to disparate content databases, to deliver video content both through live or on-demand streaming to Internet-connected viewing screens and as content downloaded to networked media players for local playback controlled by the media player.

In contrast, the process 100 performed by the software application of some embodiments eliminates the need to use multiple systems to support video delivery for both streaming and local playback. The software allows users to create multimedia playlists by simply launching a web browser or an application that connects to a web service on the Internet. In this way, the user is able to interface with any of several video sources, images, and data streams and combine them together into a single playlist (or several playlists, each comprised of video, image, and data content). Once created, the user can assign these playlists to channels for subsequent distribution over the Internet. For instance, any playlist that the user creates can be simultaneously streamed to Internet connected browsers, phones, tablets, connected TVs and other streaming devices, and downloaded to remote media players for offline playback.

As shown in FIG. 1, the process 100 starts when a user logs in and uploads (at 110) video content. In some embodiments, the user uploads the video content by using a set of software application tools for uploading content. In other embodiments, the user uploads the video content by using one or more web services of an application server that provides content uploading tools for selecting, transmitting, and organizing video content files for upload to a central repository. For instance, using a computing device (e.g., a PC, a tablet computing device, a smart phone, etc.) with an Internet connection, the user is able to access the software running on the application server from a web browser via a secure login. Once logged in, the user can use multimedia content other users have uploaded to the database on the database server, and can also upload their own content.

Once the user uploads the video content, the process transitions to 120, where the software application creates multiple versions of each video content asset (i.e., item, clip, file, etc.) for preview, streaming, and download. In some embodiments, each version of the video content asset is associated with a file that the process creates and stores in a database. More particularly, video content is automatically transcoded during the upload process to generate multiple formats of the same video content (e.g., one version for low resolution preview and streaming, and another version for high resolution download to media players, etc.).

The process of some embodiments associates a resource identifier for accessing or linking to each stored database video file. The resource identifier is at least one of a universal resource locator (URL), an object identity associated with a file system, and a unique object ID associated with an operating system. In some embodiments, the process creates multiple versions for multiple transmission needs comprising at least a first streaming transmission and a second downloading transmission. In some embodiments, the first streaming transmission is a streaming protocol denoted by an Internet mark-up language. The mark-up language in some embodiments is one of hypertext markup language (HTML) and dynamic hypertext markup language (DHTML). The first transmission protocol of the first streaming transmission is provided through at least one of hypertext transfer protocol (HTTP) and file transfer protocol (FTP). In some embodiments, the second transmission is one of HTTP, FTP, and a protocol for downloading video content in a peer-to-peer (P2P) network that identifies, downloads, and assembles a plurality of video content parts from a plurality of video content providers in the P2P network.

Next, the process 100 transitions to 130 where the user accesses a video content store by way of a software playlist management service to create one or more multimedia playlists. In some embodiments, preview versions of the video content are used for video content and playlist preview. The user then adds (at 140) the playlist to a channel using software channel management service of the process 100. In some embodiments, the user also links the channel to remote media players. Thus, the content can be previewed by the user and then organized in playlists, which can then be associated with channels. Additionally, the user can also configure the networking information necessary for any remote client, such as remote networked media players, required to download the multimedia content from the database, and can link these media players to specific channels.

As the process transitions to 150, the user publishes the channel using a software content publishing service. In some embodiments, the software automatically creates (i) a resource locator URL for streaming the video content from the channel and (ii) a download link for downloading the video content to any store-and-forward client linked to the channel. For example, when a channel is published by the user, all the multimedia content associated with the playlists in the channel is downloaded from the database to any relevant media players in the correct format. At the same time the software generates a unique URL which can be used to stream a different format of the multimedia content in the channel to a web browser for viewing at a client device, such as a PC, a tablet computing device, or smart phone.

Accordingly, flow arrows of the process 100 show both streaming and downloading occurring at approximately the same time. Specifically, the process shows one flow arrow in which the video content is streamed (at 160) to at least one connected video playback client device for contemporaneous playback of the video as the video content is being streamed. The process shows another flow arrow in which the video content is downloaded (at 170) to one or more remote store-and-forward clients for local playback. In some embodiments, the store-and-forward clients are media player clients that store the video content downloaded from the channel for local playback at any connected video playback client upon request. In addition, the media player clients can store the video content downloaded from other channels for local playback upon request from any of the video playback clients.

Figure 2:
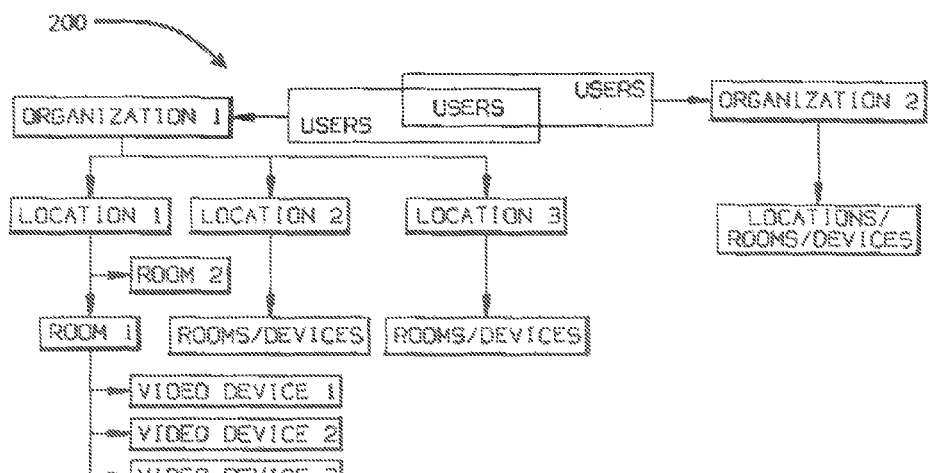
FIG. 2 conceptually illustrates a schematic diagram of a network topology of a video content creation and delivery system in some embodiments.

In some embodiments, after streaming and transmitting the video content, the user can utilize the software to generate various reports to reflect where channels have been published and how these channels are being viewed. FIG. 2 conceptually illustrates a schematic diagram of a network topology 200 of a video content creation and delivery system in some embodiments. As shown, a group of users is associated with an organization (i.e., Organization 1), which is associated with several different locations (i.e., Location 1, Location 2, and Location 3). In some embodiments, each location can be associated with one or more rooms which include one or more devices. For example, in FIG. 2, Organization 1 is associated with Location 1, which includes two rooms (i.e., Room 1 and Room 2), and where Room 1 includes Video Devices 1, 2, and 3. Likewise, Location 2 is associated with rooms and devices and Location 3 is associated with another set of rooms and video devices. While not expanded in detail in this example, Organization 2 is associated with one or more locations, each of which includes one or more rooms having one or more video devices.

Figure 3:
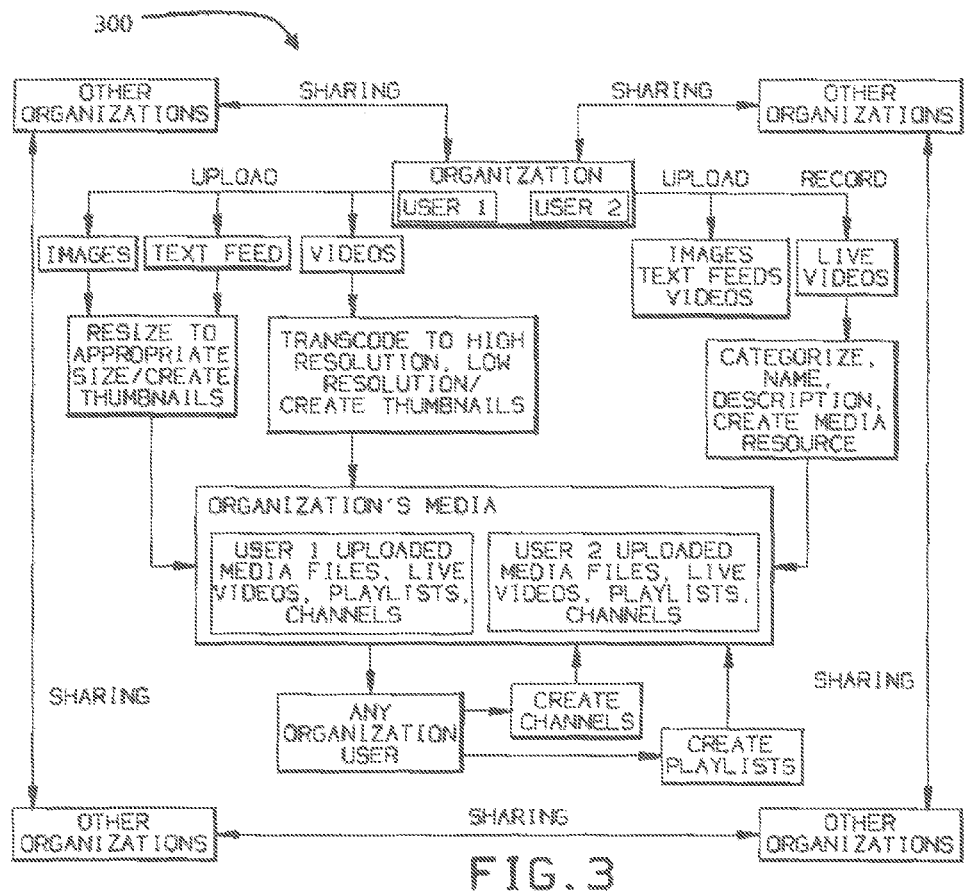
FIG. 3 conceptually illustrates a schematic diagram of multiple interconnected organizations that provide video content creation and delivery services on the same network in some embodiments.

The network topology 200 of the video content creation and delivery system in FIG. 2 conceptually illustrates location-based ordering of video content in an example topology of a single organization. In some embodiments, the video content creation and delivery system includes multiple interconnected organizations connected to the same network (e.g., the Internet) and which independently create and distribute multimedia content. FIG. 3 conceptually illustrates a schematic diagram of multiple interconnected organizations that provide video content creation and delivery services on the same network in some embodiments. Specifically, this figure shows an interconnected network topology 300 with multiple centrally managed groups of users (i.e., Organization with User 1 and User 2, and four Other Organizations) that are able to access a shared pool of multimedia content (e.g., Organization's Media), with role-based access levels/permissions (e.g., User 1, User 2, Any Organization User). Users are also able to upload their own content items (e.g., images, text feeds, videos) or record live video content (e.g., broadcast video) to categorize, name, and describe as a media resource, which is also uploaded to the pool of multimedia content. The uploaded content items and recorded videos are automatically shared with all other users in their user group(s). During the upload process, multiple versions of each content file are created (e.g., resizing images and text feeds, and transcoding multiple versions of the videos) for preview and simultaneous display on TVs, websites, smart phones, and tablets. These multiple versions of each file are automatically associated with each other, with the uploading user, and with the user group(s) that this user belongs to. Permitted users can create playlists using content from the shared content pool, and all content uploaded by them and other users in their user group(s). Templates are associated with each playlist to determine how each type of multimedia content will be displayed in relation to other types of content. Users can assign scheduling rules to playlists to control when the content will be displayed once published. Published playlists can be assigned to one or more channels, with the user able to assign multiple playlists to each channel.

Figure 4:
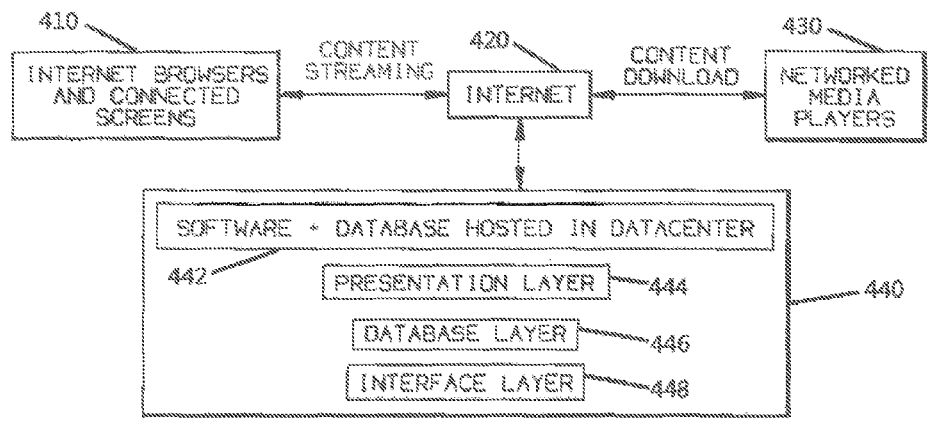
FIG. 4 conceptually illustrates a schematic view of a video content creation and delivery system that seamlessly delivers both streamed and downloaded video content in some embodiments.

While the interconnected network topology 300 of FIG. 3 is shown from the standpoint of users in a single organization that is connected to other organizations, the distribution of the organization's multimedia content over the interconnected network is described by reference to FIG. 4, which conceptually illustrates a schematic view of a video content creation and delivery system that seamlessly delivers both streamed and downloaded video content in some embodiments. In particular, this figure shows simultaneous stream and download distribution of multimedia content over the Internet 420 from a video content creation and delivery software system 440 to content playback clients 410 and store-and-forward content media players 430.

The video content creation and delivery software system 440 includes content delivery application software and an associated content database 442. The content database of some embodiments is hosted in a data center. The video content creation and delivery software system 440 further includes a plurality of application service layers for creating and distributing multimedia content. The application service layers comprise a presentation layer 444, a database layer 446, and an interface layer 448. In some embodiments, the presentation layer 444 comprises a plurality of front-end application services to which the content playback clients 410 and the content media players 430 can connect. The database layer 446 of some embodiments comprises a content database service. The interface layer 448 of some embodiments comprises a plurality of back-end application services for content delivery, monitoring, and reporting.

Each content playback client 410 comprises a web browser operating on a computing device and shown on a display screen of the computing device and other connected display screens. The web browsers connect over the Internet 420 to the content delivery application software and associated content database 442 of the video content creation and delivery software system 440. In some embodiments, content is streamed from the content delivery application software and associated content database 442 upon request from a content playback client 410.

In some embodiments, the store-and-forward content media players 430 are networked media players that are connected over the Internet 420 to the content delivery application software and associated content database 442 of the video content creation and delivery software system 440. In some embodiments, content is downloaded by the networked media players 430 from the content delivery application software and associated content database 442. The downloaded content is stored locally by the networked media players 430 for future playback controlled by the networked media players 430 in some embodiments.

In relation to the interconnected network topology 300 described by reference to FIG. 3, the seamless distribution of multimedia content by stream and download delivery in FIG. 4 demonstrates how channels can be linked to networked media players 430 in remote locations. Specifically, when a channel is published, a unique URL is generated for that channel, such that the channel is streamed to view the content by accessing this URL. For channels that are linked to remote media players 430, relevant content and playback rules are downloaded over the Internet to each media player linked to that channel after the channel is published. Content can be downloaded to remote media players 430 immediately after the publishing step or at other times. Each time a playlist or channel is modified and republished, the associated channel URL remains the same but the content streamed from this URL is automatically updated to reflect any changes in content/associated playback rules. Modifications to playlists and/or channels are also automatically downloaded to any linked remote media players 430.

II. Content Creation and Delivery System Architecture

Figure 5:
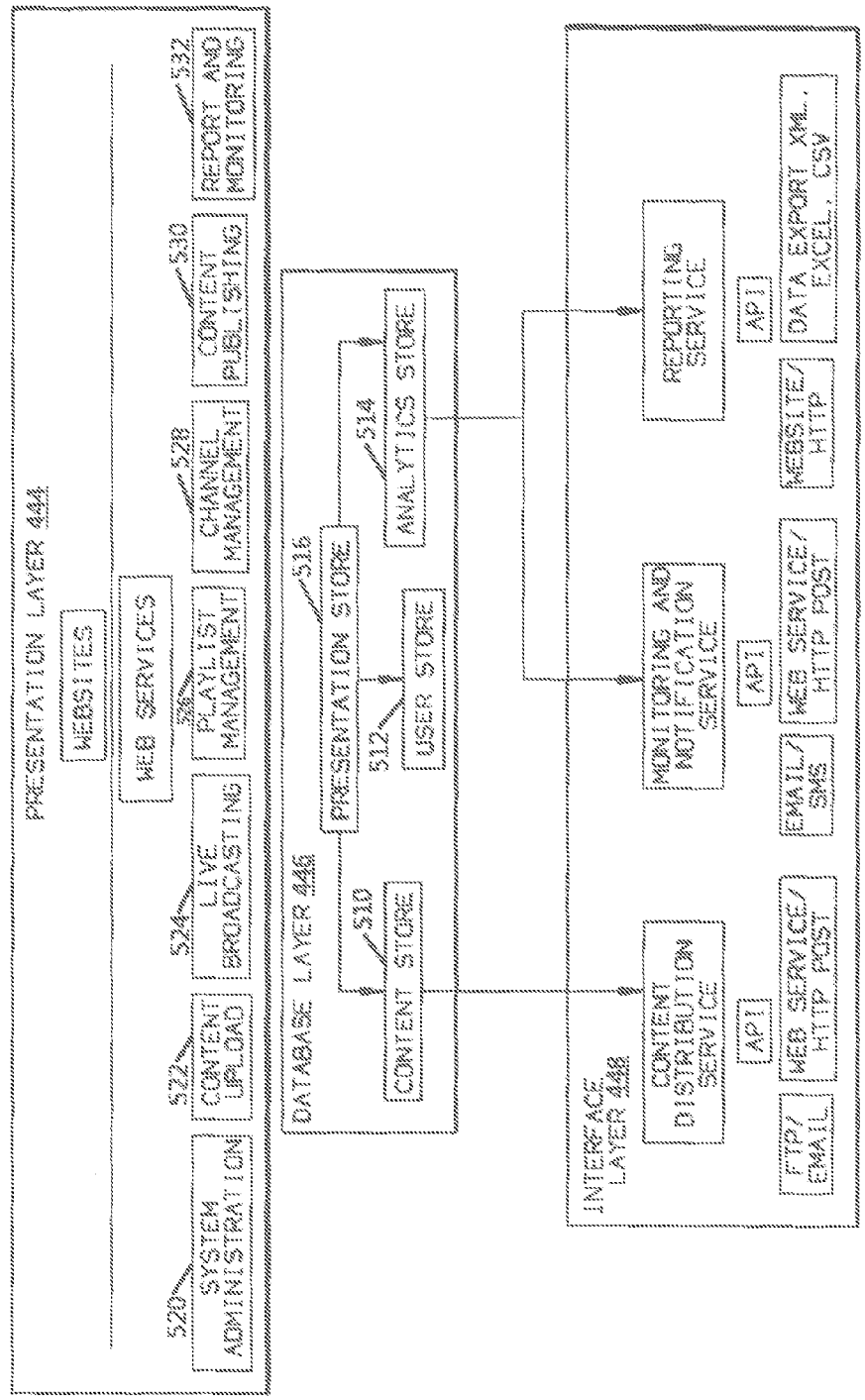
FIG. 5 conceptually illustrates a schematic view of a system architecture of the video content creation and delivery software system in some embodiments.

FIG. 5 conceptually illustrates a schematic view of a system architecture of the video content creation and delivery software system in some embodiments. The software system of some embodiments runs as an application server. In some embodiments, the application server is a hosted server that operates in a secure cloud environment. In some embodiments, the application server is a dedicated server that operates at a secure logical location (i.e., at a known IP address). The application server of some embodiments is designed to satisfy any of several service needs of multimedia content clients that connect to the hosted application server. In some embodiments, the design of the hosted application server is based on a multi-layered Service Oriented Architecture (SOA). For instance, an application server may include an enterprise service layer, a domain service layer, and an application service layer. In some embodiments, the application server comprises a presentation layer 444, a database layer 446, and an interface layer 448.

In some embodiments, the database layer 446 is linked to the other service layers by way of multiple data stores comprising a content store 510, a user content store 512, and an analytics store 514. In some embodiments, the data stores in the database layer 446 are accessible to applications in the presentation layer 444 through channels and playlists stored in a presentation store 516 that interfaces with each of the content store 510, the user content store 512, and the analytics store 514. In some embodiments, the stores 510, 512, and 514 are content databases that are hosted by one or more database servers. The databases can be online networked databases, local databases, embedded databases, or a combination of these databases. In some embodiments, the stores 510, 512, and 514 are included in a single database hosted by a database server. In some embodiments, the single database is a relational database hosted by a relational database management server. In other embodiments, the single database is an object database hosted by an object oriented database server.

The user content store in some embodiments acquires and persistently stores all user-related data. In some embodiments, the user content store comprises a plurality of user stores for a plurality of users. In these embodiments, each user is allocated a separate user content store.

The content store of some embodiments acquires and stores all multimedia content uploaded to the service along with associated content attributes, and maintains the linkages between multiple versions of the same content for preview, download or streaming.

In some embodiments, the presentation layer 444 manages all user interactions with the software, and can be linked to multiple websites for user access. The presentation layer provides access to various web services that manage different user functions. In some embodiments, these web services include system administration 520, content upload 522, live broadcasting 524, playlist management 526, channel management 528, content publishing 530, and report and monitoring 532.

The system administration service 520 provides access to various administrative functions based on user privileges, including the management of: users, organizations, locations, rooms, media players, and content sharing.

The content upload service 522 manages all functions related to uploading multimedia content. When video content is uploaded, the content upload service 522 of some embodiments automatically transcodes the multimedia content to create multiple formats of the same original multimedia content file. In some embodiments, the multiple formats are created for previewing the video content, local playback of the video content on a media player, and streaming the video content to connected viewing devices for on-demand viewing.

The live broadcasting service 524 manages all functions related to broadcasting a live video stream originating from a live video source. Users can schedule live broadcasts and publish a unique URL that allows viewers to watch the live broadcast online. In some embodiments, at the end of the broadcast, the video is archived and transferred to the content upload service 522.

The playlist management service 526 is used to create playlists of multimedia content. In some embodiments, the multimedia content of a playlist includes one or more of video content, still image content, alpha-numerical text content, symbolic icon content, and data content streams. Through an easy-to-use drag and drop interface, users access content in the content store 510 and then add the accessed content to one or more playlists. Users can choose to have playback templates created automatically, or can create or select their own templates. Once a playlist is created it can be previewed and then published to a channel. Schedules can also be assigned to playlists to control playback times. The presentation store 516 in some embodiments maintains all playlist and channel data along with the linkages between playlists, content, and user data.

The channel management service 528 allows users to create channels and add playlists to the channels. This service also manages the linking of channels to specific streaming URLs and to remote media players. Multiple playlists can be added to each channel, and channels can be grouped manually or automatically base on shared attributes.

The content publishing service 530 controls the distribution of the video content for each channel. When a channel is published, the content publishing service 530 automatically assigns a unique URL to the channel for streaming playback on any connected viewing device. This URL references the correct format for each file to be streamed from the content store 510. The content publishing service 530 also controls the downloading of the correct content format to remote media players for local playback.

In some embodiments, the system updates channels such that any changes to published channels are seamlessly delivered to the same URL as originally published, and any changes are also downloaded to respective media players. Users can also choose to have content downloaded within specific time-windows.

The reporting and monitoring service 532 allows users to generate reports on system performance and usage. In some embodiments, the reporting and monitoring service 532 accesses relevant data from the analytics store 514 in order to generate specific types of reports.

The interface layer 448 manages all the connections between the various web services, the database store, and any remote devices and services. In some embodiments, the interface layer 448 includes a plurality of application programming interfaces (APIs) for managing the connections. The plurality of APIs in some embodiments comprise a content distribution API for managing all content delivery and streaming, a monitoring and notification API for monitoring and controlling networked media players, and a reporting API for tracking and measuring system performance and usage.

III. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
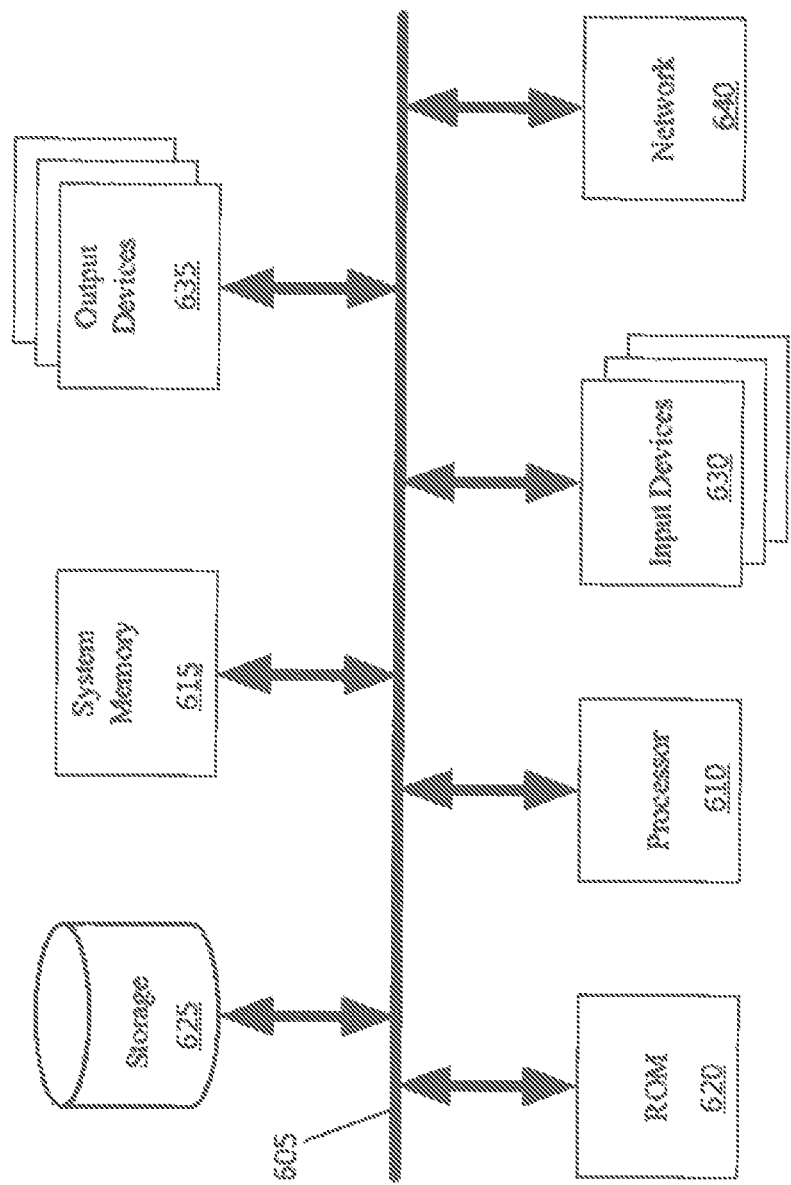
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer, phone, PDA, or any other sort of electronic device. Such an electronic system includes various types of computer readable media and interfaces for various other types of computer readable media. Electronic system 600 includes a bus 605, processing unit(s) 610, a system memory 615, a read-only 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only 620. For example, the various memory units include instructions for processing multimedia items in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing devices (also called "cursor control devices"). The output devices 635 display images generated by the electronic system 600. The output devices 635 include printers and display devices, such as cathode ray tubes (CRT) or liquid crystal displays (LCD). Some embodiments include devices such as a touchscreen that functions as both input and output devices.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), an Intranet, or a network of networks, such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows may be performed by one or more programmable processors and by one or more programmable logic circuitry. General and special purpose computing devices and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, many of the figures illustrate processes, systems, and network topologies intended for video content distribution. However, other multimedia content can be distributed in the same or similar manners (e.g., creating multiple versions of audio files, one for low-bandwidth needs, and one for high-bandwidth needs). Thus, one of ordinary skill in the art would understand that the invention is not to be limited by the foregoing illustrative details, but rather is to be defined by the appended claims.

We claim:

1. A non-transitory computer readable medium storing a program which when executed on a processor of a computing device seamlessly delivers content through a plurality of transmission protocols, said program comprising sets of instructions for:

receiving a set of video content assets from a computing device of a client user, each video content asset comprising video content;

generating a plurality of formatted video content clips based on the video content of a particular video content asset in the set of video content assets, wherein the plurality of formatted video content clips comprises a first video content clip formatted in a first format, a second video content clip formatted in a second format that is different from the first format, and a third video content clip formatted in a third format that is different from the second format and the first format;

generating a multimedia play list comprising a list entry associated with the video content of the particular video content asset;

associating the multimedia play list with a channel through which the video content of the particular video content asset can be accessed;

associating a set of video content transmission protocols with the multimedia play list associated with the channel, wherein the set of video content transmission protocols comprises a first protocol to stream the first video content clip, a second protocol to download the second video content clip, and a third protocol to preview the third video content clip;

setting playback schedules for the plurality of formatted video content clips, wherein a first playback schedule is set to stream the first video content clip for on-demand playback of the first formatted video content clip, a second playback schedule is set to download the second video content clip for on-demand playback of the second formatted video content clip, and a third playback schedule is set for playback of the third formatted video content clip at a scheduled playback time;

automatically delivering, at approximately a same time, the first formatted video content clip to a first video playback computing device associated with a particular client user by way of the first protocol to stream the first video content clip to the first video playback computing device and the second formatted video content clip to a store and forward computing device identified by the particular client user and delivered by way of the second protocol to download the second video content clip to the store and forward computing device; and delivering, at the scheduled playback time, the third formatted video content clip to a second video playback computing device by a third transmission protocol.

2. The non-transitory computer readable medium of claim 1, wherein the first transmission protocol is a streaming protocol for delivering video data of the first formatted video content clip in sequence to the first video playback computing device associated with a particular client user for contemporaneous playback of the video content.

3. The non-transitory computer readable medium of claim 1, wherein the second transmission protocol is a downloading protocol for delivering video data of the second formatted video content clip to the store and forward computing device for future retrieval by at least the first video playback computing device associated with the particular client user, wherein the second formatted video content clip is available for local playback of the video content on the first video playback computing device after all video data of the second formatted video content clip is delivered to the store and forward computing device.

4. The non-transitory computer readable medium of claim 1, wherein the store and forward computing device is a media player computing device that controls playback of the second formatted video content clip.

5. The non-transitory computer readable medium of claim 1, wherein the list entry for the video content in the multimedia play list further comprises one or more of a preview video associated with the video content, a set of text associated with the video content, and a set of images.

6. The non-transitory computer readable medium of claim 1, wherein the third formatted video content clip is a live video feed.

7. A video content creation and delivery system that distributes video content in a plurality of formats at approximately the same time, the system comprising:
- a database server connected to a computer network, said database server providing access to a set of multimedia content assets stored in a content database, wherein the set of multimedia content assets comprises (i) a first video asset formatted to stream video content for contemporaneous playback, (ii) a second video asset formatted to download video content as a video file, and (iii) a third video asset formatted to provide a preview of video content;
- a content server computing device connected to the computer network, said content server providing a plurality of services to create, organize, manage, and distribute multimedia content by a set of client computing devices operated by a set of client users, wherein the plurality of services comprises (i) a video content upload service that allows a client user to upload a video content asset from the client computing device operated by the client user to the content server computing device, (ii) a playlist management service that allows the client user to select an uploaded video content asset and create a multimedia playlist with a list entry identifying the selected video content asset and linking to at least a streaming formatted version of the video content asset and a video file download formatted version of the video content asset, (iii) a channel management service that allows the client user to select a channel to associate with the created multimedia playlist, and (iv) a multimedia content publishing service that provides a view of the multimedia playlist for retrieval of one of the streaming formatted version of the video content asset and the video file download formatted version of the video content asset from the content database for playback of the video content;
- a content playback computing device that connects to the content server computing device through the computer network, said content playback computing device configured to receive each of (i) a stream of video content data associated with the streaming formatted version of the video content asset and (ii) a set of playback commands associated with the video file download formatted version of the video content asset, wherein the content playback computing device is further configured to (i) display the video content contemporaneously with receiving the stream of video content data when the list entry identifying the video content asset is selected from the multimedia playlist on the content server for immediate on-demand playback and (ii) display the video content after receiving the video file download formatted version of the video content asset when the list entry identifying the video content asset is selected from the multimedia playlist on the content server for delayed playback;
- a store-and-forward computing device configured to connect to the content server computing device through the computer network to download and store the video file download formatted version of the video content asset listed in the multimedia playlist and to control playback of the video file download formatted version of the video content asset by one or more client computing devices after the video file download formatted version of the video content asset is stored; and
- a reporting server that generates multimedia content asset reports.

8. The system of claim 7, wherein the plurality of services to create, organize, manage, and distribute multimedia content further comprises a system administration service that allows a content server administrative client user to perform administrative operations to multimedia content stored in the content database, perform content server user account management to add, remove, and change user accounts, and perform analytics administration in relation to a set of content reporting analysis operations.

9. The system of claim 8, wherein the plurality of services are accessible to a client user through an interface layer comprising (i) a content distribution service and an associated set of content distribution tools, (ii) a monitoring and notification service and an associated set of monitoring and notification tools, and (iii) a reporting service and an associated set of reporting tools.

10. The system of claim 9, wherein the set of content distribution tools comprises a content distribution API, at least one of an FTP server and an email server, and a content posting server, wherein the set of monitoring and notification tools comprises a monitoring and notification API, at least one of an email server and an SMS text messaging server, and a content posting server, wherein the set of reporting tools comprises a reporting API, a reporting website, and a data export tool to export reporting data to a file in a particular format.

11. The system of claim 10, wherein the particular format of the export file is one of XML format, Excel format, and CSV format.

12. The system of claim 7, wherein the plurality of services further comprises a live broadcasting service that captures video content of a broadcast in real-time, wherein a second video play list comprises video content delivered from a live video feed provided by the live broadcasting service.

13. The system of claim 7, wherein the video data is associated with a restricted streaming playback time schedule and an on-demand store-and-forward playback time schedule.

14. The system of claim 13, wherein the stream of video data received by the content playback computing device is distributed by the content server computing device during the restricted streaming playback time and the entirety of video data stored by the store-and-forward computing device is distributed by the content server computing device at any time on-demand.

* * * * *